United States Patent [19]
Rossi

[11] Patent Number: 6,104,293
[45] Date of Patent: *Aug. 15, 2000

[54] WARNING SYSTEM FOR DETECTING PRESENCE OF A CHILD IN AN INFANT SEAT

[76] Inventor: Marc A. Rossi, 43473 Golden Meadow Cir., Ashburn, Va. 20146-0826

[ * ] Notice: This patent is subject to a terminal disclaimer.

[21] Appl. No.: 09/391,287

[22] Filed: Sep. 7, 1999

Related U.S. Application Data

[63] Continuation of application No. 09/123,739, Jul. 28, 1998, Pat. No. 5,949,340.

[51] Int. Cl.[7] .................................................. G08B 23/00
[52] U.S. Cl. .................................. 340/573.1; 340/425.5; 340/457; 340/667
[58] Field of Search ................................ 340/425.2, 426, 340/438, 457, 667, 573.1, 573.4; 180/273; 280/730.1, 732, 735

[56] References Cited

U.S. PATENT DOCUMENTS

| | | |
|---|---|---|
| 3,836,955 | 9/1974 | Cracraft et al. .......................... 340/522 |
| 5,316,868 | 5/1994 | Dougherty et al. .......................... 429/9 |
| 5,454,591 | 10/1995 | Mazur et al. ............................. 280/735 |
| 5,482,314 | 1/1996 | Corrado et al. .......................... 280/735 |
| 5,581,234 | 12/1996 | Emery et al. ......................... 340/457.1 |
| 5,783,871 | 7/1998 | LeMense ................................. 280/735 |
| 5,793,291 | 8/1998 | Thornton ................................. 340/457 |
| 5,949,340 | 9/1999 | Rossi .................................... 340/573.1 |

Primary Examiner—Daniel J. Wu
Assistant Examiner—Van T. Trieu
Attorney, Agent, or Firm—Rossi & Associates

[57] ABSTRACT

An apparatus is provided for warning when a child has been left in an infant seat and a vehicle as been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal. The components of the apparatus can be located within the infant seat, within the vehicle or combined within the infant seat and the vehicle.

8 Claims, 2 Drawing Sheets

WARNING SYSTEM FOR DETECTING PRESENCE OF A CHILD IN AN INFANT SEAT

CROSS-REFERENCE TO RELATED APPLICATIONS

The present application is a continuing application of and claims priority from U.S. patent application Ser. No. 09/123,739 filed Jul. 28, 1998, now U.S. Pat. No. 5,949,340 notice of allowance received May 11, 1999, the contents of which are incorporated herein by reference.

FIELD OF THE INVENTION

The invention relates in general to a system for detecting the presence of an automobile occupant. In particular, the invention relates to system for generating an alarm when the vehicle has been turned off and a child has been left in an infant seat.

BACKGROUND OF THE INVENTION

There have been a number of tragic deaths in which children have been mistakenly left in automobiles after the driver had reached their desired destination and left the vehicle. The deaths have usually been caused by a buildup of excessive heat or excessive cold within the vehicle during the absence of the driver. Infants, in particular, are susceptible to dehydration when subjected to the elevated temperatures within an enclosed vehicle, and can easily slip into a comatose state.

One system for preventing children from becoming inadvertently locked within a vehicle is described in U.S. Pat. No. 5,793,291. The system utilizes a motion detector to detect the presence of a child or pet within a located vehicle. While this system provides some advantages, particularly in the case of older children that may inadvertently lock themselves in a vehicle while playing and may be actively seeking escape, it fails to protect infants who have been left asleep in their child seats and are not capable of sufficient activity to set off a motion detector. Infants, for example, may become dehydrated during sleep and may drift into a comatose state without ever waking.

In view of the above, it is an objective of the invention to provide a system that warns when a child has been left in the infant seat under dangerous conditions. It is a further object of the invention to provide a system that warns when a child has been left in an infant seat and the vehicle's ignition has been turned off.

SUMMARY OF THE INVENTION

The invention provides an apparatus for warning when a child has been left in an infant seat and a vehicle as been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal. The components of the apparatus can be located within the infant seat, within the vehicle or combined within the infant seat and the vehicle.

DETAILED DESCRIPTION OF THE PREFERRED EMBODIMENTS

Figure 1:
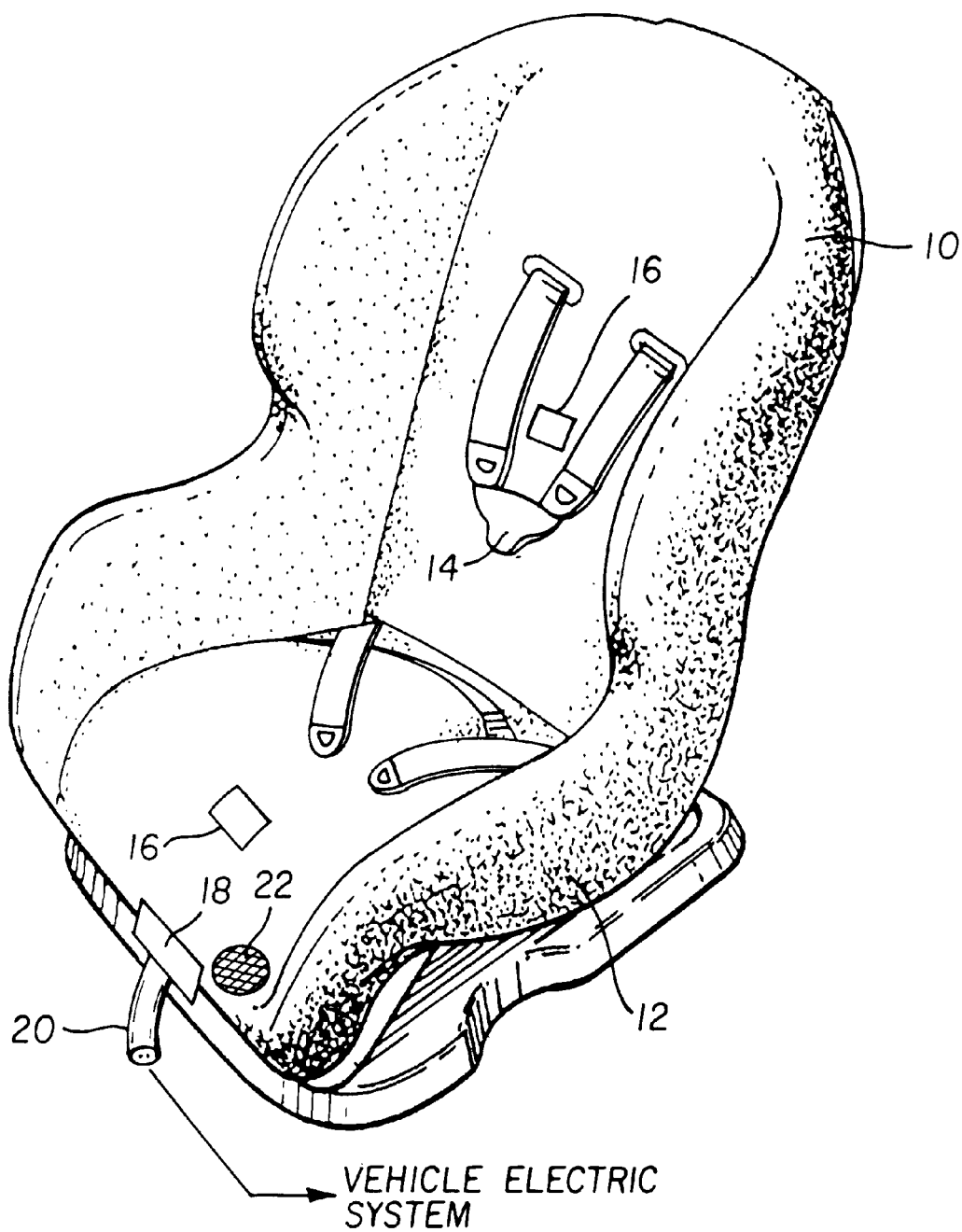
FIG. 1 illustrates an infant seat in accordance with the invention.

FIG. 1 illustrates an automobile infant or child seat in accordance with the present invention including a back support 10, a seat support 12 and a safety harness 14. Although not specifically illustrated, the frame of the seat is adapted to be fastened into place within an automobile in a conventional manner using the seat belts of the automobile. Alternatively, the infant seat may include a base unit that remains within the vehicle and a seat unit that attaches to the base unit in a conventional manner. Still further, the infant seat may be of a type that is built into the vehicle.

The infant seat includes an occupant sensor 16 preferably located in the back support 10 and/or the seat support 12, although the occupant sensor 16 may also be located anywhere within the infant seat or within the vehicle into which the infant seat is placed. The occupant sensor 16 comprises any means for detecting the presence of an occupant in the infant seat, including but not limited to a mechanical switch, an optical detector, a heat detector, a sonar detector and a weight detector. The occupant sensor 16 generates a signal indicative of the presence of an occupant being located in the seat that is sent to a control unit 18.

Figure 2:
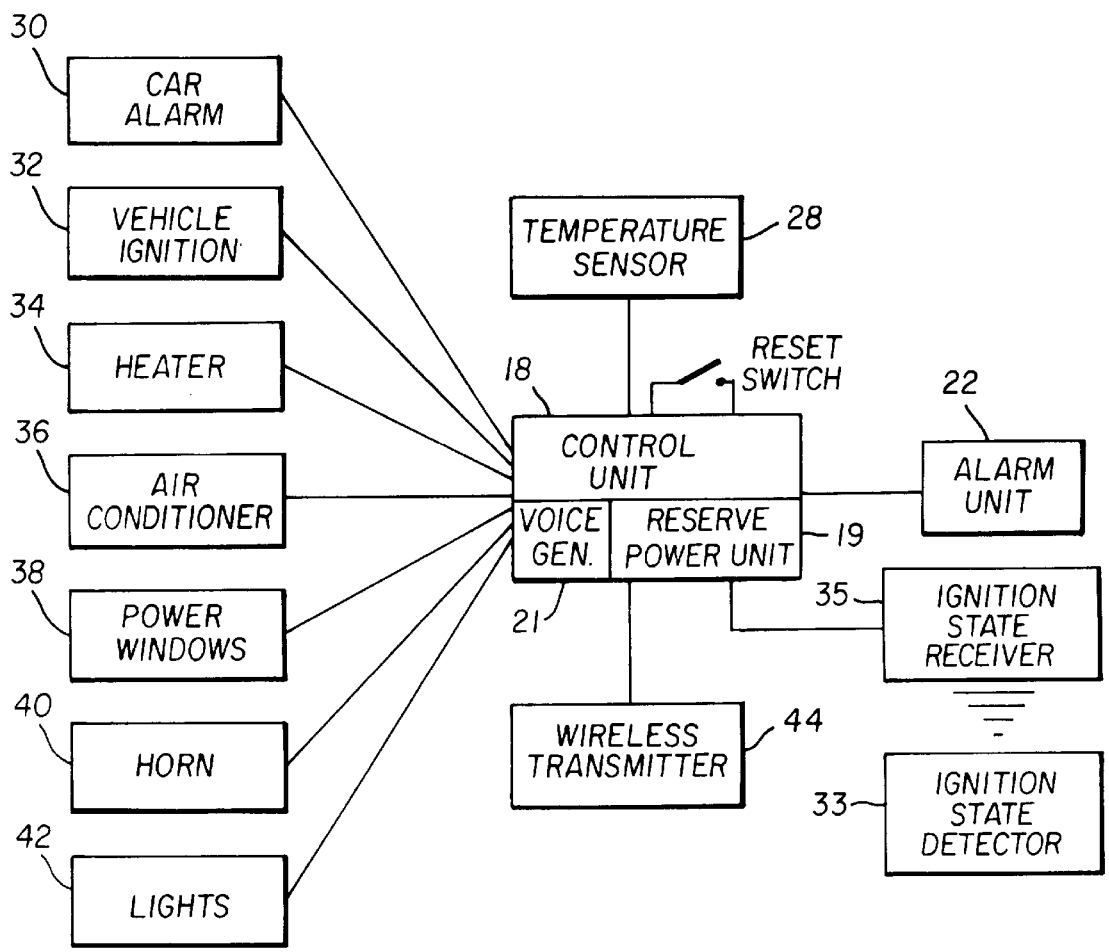
FIG. 2 is a block diagram illustrating the connection of a control unit to various components of a vehicle into which the infant seat of FIG. 1 is placed.

The control unit 18 is located within the infant seat or alternatively within the vehicle into which the infant seat is placed. An onboard computer provided in the vehicle, for example, can be utilized to perform the functions of the control unit 18. Further, the control unit 18 can be implemented utilizing programed general purpose processors, application specific processors, firmware and discrete components or combinations thereof. In the illustrated embodiment, the control unit 18 is provided in the seat and an electrical connector 20 is used to couple the control unit 18 to the electrical system of the vehicle. The electrical connector 20 preferably provides a power connection to supply power from the vehicle's battery to the control unit 18 and the occupant sensor 16, and at least an ignition "On" connection (for example a connection to the ignition circuit 32 illustrated in FIG. 2) so that the control unit 18 can detect whether the vehicle ignition is "On" or "Off". As a further precaution, the control unit 18 may be provided with a reserve power unit 19 to enable the control unit 18 to continue operation even if the vehicle's battery has lost power. The reserve power unit 19 preferably includes rechargeable batteries or capacitors that can be recharged from the vehicle's electrical system, other sources such as solar cells or periodically replaced by the vehicle's driver. Alternatively, the control unit 18 may be powered solely by the power unit 19, as opposed to requiring a power connection to the vehicle's electrical system.

While the preferred embodiment illustrates the use of a "hard" wire connection to the vehicle's ignition system to determine the "On" state of the vehicle, it will be recognized by those of skill in the art that a wireless connection, for example infrared, sonic or RF, may readily be employed. For example, in a further embodiment, a wireless ignition state detector 33 is activated when the vehicle ignition is "On" to send periodic sonic pulses to a wireless ignition state receiver 35 coupled to the control unit 18, that provide an indication to the control unit 18 that the vehicle's ignition is "On". An ignition "Off" state is detected when the control unit 18 fails to receive a signal from the wireless ignition state detector 35. Coupling the use of the wireless ignition detector 35 with the use of the power unit 19 as the primary power source, the requirement for a physical connection between the seat and the vehicle can be avoided.

In operation, the infant seat is placed within a vehicle and a child is placed within the infant seat for transport within the vehicle. The occupant sensor 16 supplies a signal to the control unit 18 indicating that the infant seat is occupied. At this point, the control unit 18 preferably provides a signal to an alarm unit 22, for example a light, buzzer or a speaker, to remind the vehicle driver to fasten the safety harness 14. The control unit 18, for example, preferably includes a voice generator 21 that sends a signal to the alarm unit 22 to sound a message "PLEASE FASTEN THE SAFETY HARNESS". Still further, a sensor (not shown) can be included within the safety harness 14 to indicate to the control unit 18 that the safety harness 14 has in fact been fastened, thereby signaling the control unit 18 to discontinue the warning message. Once the child is properly secured in the seat, the driver proceeds to drive the vehicle to the desired destination.

Upon reaching the desired destination, the driver will turn off the ignition of the vehicle. At this point, the control unit 18, having sensed that the ignition is off, preferably generates an alarm to remind the vehicle driver that the child is still in the seat. For example, the voice generator 21 of the control unit 18 generates a message stating "PLEASE REMOVE CHILD FROM SEAT". The message is repeated if the child is not removed from the seat within a specified period. As an optional feature, the control unit 18 may allow the specified time period to be adjusted by the vehicle operator.

Although it is believed that the above reminder should be sufficient to remind the driver to remove the child from the seat, it may still be possible that the driver is distracted and ignores the message. If the child has not been removed within a further predetermined time, then it must be presumed that the driver has left the vehicle without taking the child. Accordingly, it may be necessary to provide for a more urgent warning. In a further embodiment, the connector 20 also provides a connection to one or more of the vehicle's car alarm 30, horn circuit 40 and light circuit 42, so that the control unit 18 can activate the vehicle's car alarm (if so equipped), the horn and/or the lights of the vehicle to attract attention if the further predetermined time period has lapsed. In a still further embodiment, a temperature sensor 28 is provided to sense the temperature within the vehicle. If the temperature exceeds a predetermined limit, the control unit 18 can activate the power window circuit 38 of the vehicle to open the windows and/or turn on a cooling fan (not shown). Alternatively, the control unit 18 can activate the vehicle ignition circuit to start the vehicle, and further control the air conditioning unit 36 and the heater 34 of the unit to maintain the temperature at a safe setting. Still further, the control unit 18 can activate a transmitter 44 to transmit an emergency message to a remote location. The transmitter 44, for example, can include the vehicle's cellular phone, a transmitter used as a vehicle locator in case of theft or any other type of wireless transmitter.

It will be apparent to one of ordinary skill in the art that various components discussed above can be incorporated into either the infant seat or the vehicle into which the infant seat is to be placed. All of the components of the system may be provided as part of the vehicle structure instead of located in the structure of the infant seat. Accordingly, the invention can be vehicle based, seat based or a combination of both.

The invention has been described with reference to certain preferred embodiments thereof. It will be understood, however, that modifications and variations are possible within the scope of the appended claims. Still further, although it is preferred that the control unit 18 directly detect the state of the vehicle ignition, a separate sensor or detection unit can be employed to detect the state of the vehicle ignition and supply a signal to the control unit. And still further, there may be times when the driver does not wish to remove the child immediately from the infant seat upon deactivation of the ignition. In such cases, a reset switch can be provided to allow the driver to reset the time period counted by the control unit prior to activation of the alarm.

What is claimed is:

1. An apparatus comprising:

occupant detection means for detecting the presence of an occupant within a child seat located within a vehicle;

vehicle ignition detection means for detecting the state of the vehicle's ignition system;

control means for generating an alarm signal when the occupant detection means detects the presence of an occupant within the child seat and the vehicle ignition detection means detects that vehicle's ignition system has been turned from an "on" state to an "off" state;

electrical power means for supplying electrical power to the control means; and an alarm that is responsive to the alarm signal.

2. An apparatus as claimed in claim 1, wherein the electrical power means includes a reserve power unit.

3. An apparatus as claimed in claim 1, wherein the vehicle ignition detection means includes a wireless ignition state transmitter coupled to the vehicle's ignition circuit and a wireless ignition state receiver coupled to the control means.

4. An apparatus as claimed in claim 1, wherein the occupant detection means comprises an occupant sensor located within the infant seat.

5. An apparatus as claimed in claim 1, wherein the alarm generates a voice signal.

6. An apparatus as claimed in claim 1, wherein the alarm comprises at least one of a buzzer, a light and a speaker.

7. An apparatus as claimed in claim 1, wherein the control means controls the operation of at least one of the vehicle's car theft alarm, vehicle ignition, heater, air conditioner, power windows, horn and lights after a predetermined time period if the occupant detection means indicates that the occupant has not been removed from the infant seat.

8. An apparatus as claimed in claim 1, wherein the control means controls the operation of a transmitter to transmit an emergency signal after a predetermined time period if the occupant detection means indicates that the occupant has not been removed from the infant seat.

* * * * *